US008875584B2

(12) United States Patent
Sasajima (10) Patent No.: US 8,875,584 B2
(45) Date of Patent: Nov. 4, 2014

(54) PRESSURE-SENSITIVE SENSOR, AND GRIP APPARATUS AND ROBOT MANIPULATOR EQUIPPED WITH THE SAME

(71) Applicant: Canon Kabushiki Kaisha, Tokyo (JP)

(72) Inventor: Kenta Sasajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 13/674,906

(22) Filed: Nov. 12, 2012

(65) Prior Publication Data

US 2013/0145856 A1 Jun. 13, 2013

(30) Foreign Application Priority Data

Dec. 9, 2011 (JP) ................................. 2011-270015

(51) Int. Cl.
*G01B 7/16* (2006.01)
*G01L 1/20* (2006.01)
*G01L 1/00* (2006.01)

(52) U.S. Cl.
CPC .. *G01L 1/005* (2013.01); *G01L 1/20* (2013.01)
USPC .......................................................... 73/774

(58) Field of Classification Search
CPC .......... G01L 1/14; G01L 9/002; G01I 9/0058; C08L 21/00
USPC .............. 73/774, 818, 862.381, 862.391, 714
See application file for complete search history.

(56) References Cited

U.S. PATENT DOCUMENTS

| 3,624,619 | A | * | 11/1971 | Ambrosio | .................... 178/17 D |
| 4,246,908 | A | * | 1/1981 | Inagaki et al. | ................ 600/561 |
| 4,475,008 | A | * | 10/1984 | Doi et al. | .................... 178/18.05 |
| 4,585,987 | A | * | 4/1986 | Prue et al. | ...................... 323/275 |
| 5,629,488 | A | * | 5/1997 | Kropp | ........................ 73/862.68 |
| 6,094,054 | A | * | 7/2000 | Crist | ............................. 324/452 |
| 7,234,357 | B2 | * | 6/2007 | Silverbrook et al. | ........... 73/754 |
| 7,526,961 | B2 | * | 5/2009 | Downie et al. | .................. 73/718 |

FOREIGN PATENT DOCUMENTS

| JP | 9-17276 A | 1/1997 |
| JP | 2004-340731 A | 12/2004 |

* cited by examiner

*Primary Examiner* — Max Noori
(74) *Attorney, Agent, or Firm* — Fitzpatrick, Cella, Harper & Scinto (57) ABSTRACT

A pressure-sensitive conductive rubber for reference is provided inside a housing in such a state that preload is imposed thereon. A pressure-sensitive conductive rubber for detection is also provided inside the housing in such a state that preload is imposed thereon and an external load acts thereon. A load detecting circuit applies voltage to the pressure-sensitive conductive rubbers to determine the external load based on a difference between a detected value corresponding to electric current flowing through the pressure-sensitive conductive rubber for reference and a detected value corresponding to electric current flowing through the pressure-sensitive conductive rubber for detection.

4 Claims, 5 Drawing Sheets

PRESSURE-SENSITIVE SENSOR, AND GRIP APPARATUS AND ROBOT MANIPULATOR EQUIPPED WITH THE SAME

BACKGROUND OF THE INVENTION

1. Field of the Invention

The present invention relates to a pressure-sensitive sensor for detecting an external load using a pressure-sensitive conductive rubber, and a grip apparatus and a robot manipulator equipped with the same.

2. Description of the Related Art

Conventionally, there is known a pressure-sensitive sensor including a pressure-sensitive conductive rubber made by containing conductive particles such as fine metal particles in rubber. When no load is applied, since conductive particles contained in the rubber have no or little contact with each other, the pressure-sensitive conductive rubber is electrically insulated or in a highly resistive state. Then, when load is applied to press on the pressure-sensitive conductive rubber, the rubber part is deformed to bring the conductive particles come close to each other in the deformed portion. In this case, since the number of conductive particles in a contact state increases, the electric resistance value of the pressure-sensitive conductive rubber decreases as a whole. The pressure-sensitive sensor takes advantage of the characteristic of changing the electric resistance value according to the load on the pressure-sensitive conductive rubber.

As this kind of pressure-sensitive sensor, there is known a pressure-sensitive sensor disclosed in Japanese Patent Application Laid-Open No. H09-17276. The pressure-sensitive sensor in Japanese Patent Application Laid-Open No. H09-17276 has a flat plate of pressure-sensitive conductive rubber arranged on electrodes partially provided on a substrate, and a flexible sheet member made of thin layers of resin. The pressure-sensitive sensor also has a spacer for supporting, with a given gap, a part formed by putting the flexible sheet member on the pressure-sensitive conductive rubber. This spacer is provided on the surface of the substrate. Further, the pressure-sensitive sensor has a buffer material made of rubber or the like and provided on a surface opposite to the surface of the flexible sheet member supported by the spacer, and a cover member, which integrally covers the spacer, the flexible sheet member, and the buffer material, and is bound onto the surface of the substrate. In Japanese Patent Application Laid-Open No. H09-17276, load applied to the cover member is buffered and dispersed by the buffer material and the flexible sheet member so that the load will be gradually transmitted to the pressure-sensitive conductive rubber. Thus, since the load pressing on the pressure-sensitive conductive rubber per unit area is reduced, the electric resistance value does not change sharply, enabling widening of a load detection range.

Further, since the pressure-sensitive conductive rubber is made by containing conductive particles in rubber, there are the hysteresis characteristics of rubber whose deformation due to the application or release of load remains, and the creep characteristics of rubber continuing to deform slowly with a certain constant load. Because of the hysteresis characteristics and creep characteristics of rubber, the change of electric resistance value with respect to the load becomes nonlinear. Japanese Patent Application Laid-Open No. 2004-340731 discloses a pressure-sensitive sensor for reducing this nonlinearity. The pressure-sensitive sensor disclosed in Japanese Patent Application Laid-Open No. 2004-340731 includes a pressure-sensitive conductive rubber formed in the shape of a disk having flat surfaces on top and bottom, electrodes arranged on the top and bottom surfaces of the pressure-sensitive conductive rubber to face each other, and an enclosure member made of metal or resin to constrain the deformation of the pressure-sensitive conductive rubber in a direction different from a direction in which load is received around the pressure-sensitive conductive rubber. Since the deformation of the pressure-sensitive conductive rubber in a radial direction is constrained to make the pressure-sensitive conductive rubber deform only in a thickness direction as the load application direction, an increase in the contact areas between the pressure-sensitive conductive rubber and the electrodes are restricted upon application of load to reduce the nonlinearity between the load and the electric resistance value.

However, the structure having a gap between a pressure-sensitive sensor and a member for transmitting load to the pressure-sensitive sensor, like the gap between the pressure-sensitive conductive rubber and the flexible sheet member in Japanese Patent Application Laid-Open No. H09-17276, cannot obtain the sensor's output for a minute amount of load (e.g., load no more than 1N). The reason why the load cannot be detected by the pressure-sensitive conductive rubber is because the load has to continue to be applied until the gap between the pressure-sensitive conductive rubber and the member for transmitting the load to the pressure-sensitive conductive rubber disappears in order to apply load to the pressure-sensitive sensor and transmit the load to the pressure-sensitive conductive rubber. In other words, in order to detect a minute amount of load, it is desired to provide such a structure as to eliminate a gap between the pressure-sensitive conductive rubber and the member for transmitting load to the pressure-sensitive conductive rubber or to make the gap vanishingly small. Therefore, it is better to provide such a structure as to apply a pressing force (preload) between the pressure-sensitive conductive rubber and the member for transmitting load to the pressure-sensitive conductive rubber so that even a minute amount of load will be transmitted to the pressure-sensitive conductive rubber.

Figure 6:
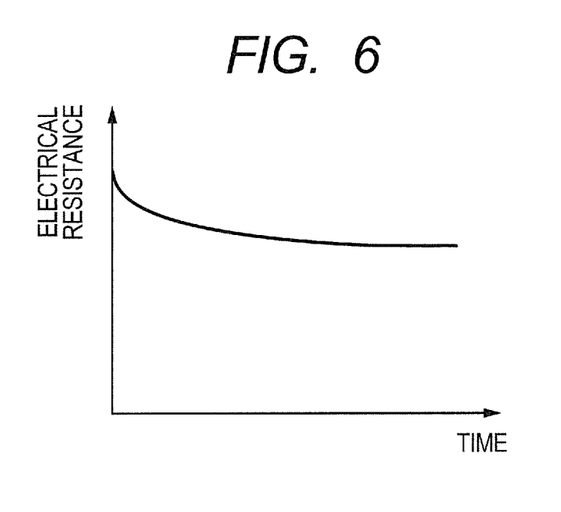
FIG. 6 is a graph illustrating the creep characteristics of a pressure-sensitive conductive rubber.

However, since the pressure-sensitive conductive rubber is made by containing conductive particles in rubber, if preload is imposed between the pressure-sensitive conductive rubber and the member for transmitting load to the pressure-sensitive conductive rubber, the electric resistance value of the pressure-sensitive conductive rubber will be reduced with time due to the creep characteristics of rubber as shown in FIG. 6. Although the nonlinearity between the load and the electric resistance value due to the hysteresis characteristics and creep characteristics of rubber is reduced in Japanese Patent Application Laid-Open No. 2004-340731, the creep characteristics is not improved in nature. Thus, in Japanese Patent Application Laid-Open No. 2004-340731, since the electric resistance value is reduced with time in such a state that preload is imposed on the pressure-sensitive conductive rubber, an increase in detection accuracy of load on the pressure-sensitive sensor leads to false detection of load. In this case, the detection accuracy of load cannot be increased and hence a minute amount of load cannot be detected.

Therefore, it is an object of the present invention to provide a pressure-sensitive sensor capable of increasing the detection accuracy of load on a pressure-sensitive sensor to detect a minute amount of load even when preload is imposed on a pressure-sensitive conductive rubber to reduce the electric resistance value of a pressure-sensitive conductive rubber with time due to the creep characteristics of rubber.

SUMMARY OF THE INVENTION

The present invention is characterized by including a first pressure-sensitive conductive rubber provided inside a housing in such a state that preload is imposed thereon, and a second pressure-sensitive conductive rubber provided inside the housing in such a state that the preload is imposed thereon and an external load acts thereon.

According to the present invention, since the external load is determined based on a difference between the detection results of the first pressure-sensitive conductive rubber on which the preload is imposed and the second pressure-sensitive conductive rubber on which the preload is imposed and the external load acts, variations in the creep characteristics of the pressure-sensitive conductive rubbers are canceled out and corrected. Thus, the detection accuracy of the external load is improved.

Further features of the present invention will become apparent from the following description of exemplary embodiments with reference to the attached drawings.

BRIEF DESCRIPTION OF THE DRAWINGS

FIGS. 2A and 2B are illustrative views illustrating the schematic structure of the pressure-sensitive sensor according to the first embodiment of the present invention, where

DESCRIPTION OF THE EMBODIMENTS

Exemplary embodiments of the present invention will now be described in detail with reference to the accompanying drawings.

First Embodiment

Figure 1:
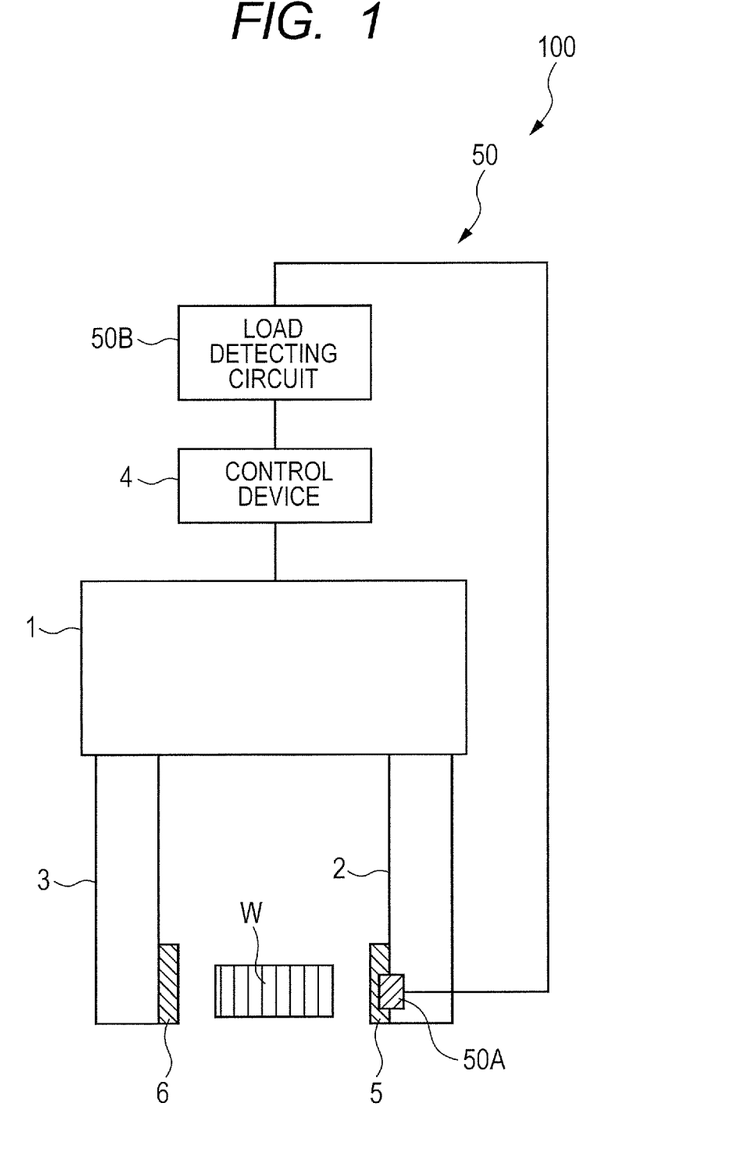
FIG. 1 is an illustrative diagram illustrating the schematic structure of a grip apparatus in which a pressure-sensitive sensor according to a first embodiment of the present invention is incorporated.

FIG. 1 is an illustrative diagram illustrating the schematic structure of a grip apparatus in which a pressure-sensitive sensor according to a first embodiment of the present invention is incorporated. A grip apparatus 100 illustrated in FIG. 1 includes a base 1, two or more fingers 2 and 3 provided on the base 1, and a controller 4 for opening and closing the fingers 2 and 3. The base 1 includes an actuator, not illustrated. In response to a control signal from the controller 4, the actuator closes the fingers 2 and 3 to hold a workpiece W or opens the fingers 2 and 3 to release the holding of the workpiece W.

Further, cover members 5 and 6 as elastic members made of rubber are provided in a tip portion of each of the fingers 2 and 3 to prevent the workpiece W from being damaged when the workpiece W is held by the fingers 2 and 3.

In the embodiment, a pressure-sensitive sensor 50 is provided in the grip apparatus 100 to detect load exerted from the outside (external load) in order to detect the holding/releasing of the workpiece W. Based on the detection result from the pressure-sensitive sensor 50, the controller 4 controls the actuator of the base 1 to actuate the fingers 2 and 3.

The pressure-sensitive sensor 50 has a sensor body 50A and a load detecting circuit 50B as a load detecting portion. At least one of the plural fingers 2 and 3, the finger 2 in the embodiment, is provided with a sensor body 50A of the pressure-sensitive sensor 50 in such a manner that the sensor body 50A and the cover member 5 are laminated sequentially on the finger 2. The cover member 5 is provided to cover the sensor body 50A to protect the sensor body 50A as well.

Figure 2A:
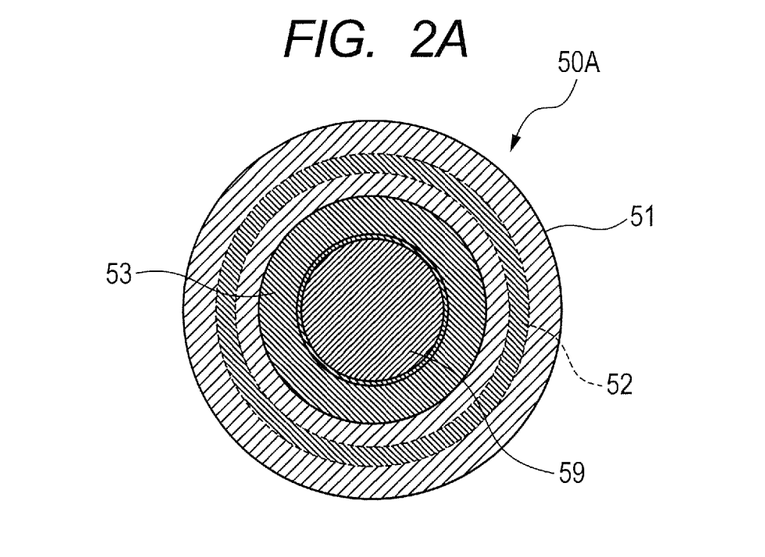
FIG. 2A is a top view of a sensor body and FIG. 2B is a sectional view of the sensor body in such a state that the sensor body is incorporated in a finger.
Figure 2B:
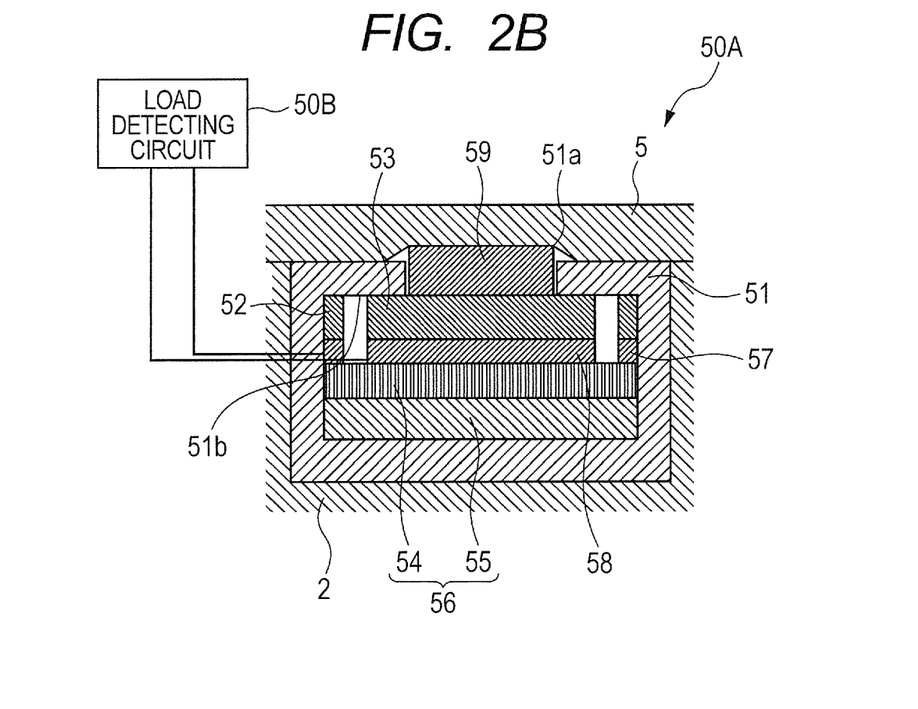

FIGS. 2A and 2B are illustrative views of the schematic structure of the pressure-sensitive sensor according to the embodiment of the present invention, where FIG. 2A is a top view of the sensor body and FIG. 2B is a sectional view of the sensor body in such a state that the sensor body is incorporated in the finger.

The sensor body 50A has a housing 51, a pressure-sensitive conductive rubber 52 for reference as a first pressure-sensitive conductive rubber provided inside the housing 51, and a pressure-sensitive conductive rubber 53 for detection as a second pressure-sensitive conductive rubber provided inside the housing 51. The sensor body 50A also has a biasing portion 56 made up of a movable member 54, provided inside the housing 51 to be movable along the inner wall of the housing 51, and an elastic member 55, an electrode 57 connected to the pressure-sensitive conductive rubber 52 for reference, and an electrode 58 connected to the pressure-sensitive conductive rubber 53 for detection.

The housing 51 is a member having rigidity to such a degree that no deformation occurs even when an amount of external load within a range desired to detect acts on the housing 51. For example, the housing 51 is made of metal or resin. An opening portion 51a is formed in the housing 51. In the embodiment, the pressure-sensitive conductive rubber 53 for detection is arranged to face the opening portion 51a and an inner wall surface 51b on the side of which the opening portion 51a is formed. The pressure-sensitive conductive rubber 52 for reference is arranged to face the inner wall surface 51b. Then, the pressure-sensitive conductive rubbers 52 and 53, the electrodes 57 and 58, and the biasing portion 56 are laminated inside the housing 51 in this order in a direction to get away from the inner wall surface 51b.

The pressure-sensitive conductive rubbers 52 and 53 are formed by containing conductive particles in rubber such as silicon rubber. The pressure-sensitive conductive rubber 53 for detection is formed in the shape of a circular disk. An acting piece 59 is provided on this pressure-sensitive conductive rubber 53 for detection in such a manner to be exposed on the outside of the housing 51 through the opening portion 51a so that an external load will act on the acting piece 59. The acting piece 59 is made of rubber or metal, and fixed on the pressure-sensitive conductive rubber 53 for detection with an adhesive or the like. This acting piece 59 is formed to project outside of the housing 51 so that the external load will easily act on the acting piece 59.

The pressure-sensitive conductive rubber 52 for reference has the shape of a circular ring, and is arranged concentrically on the outer side of the pressure-sensitive conductive rubber 53 for detection with a clearance from the pressure-sensitive conductive rubber 53 for detection. The pressure-sensitive conductive rubber 52 for reference and the pressure-sensitive conductive rubber 53 for detection are electrically and mechanically insulated so that the external load acting on the pressure-sensitive conductive rubber 53 for detection will not act on the pressure-sensitive conductive rubber 52 for reference.

These pressure-sensitive conductive rubbers 52 and 53 are brought into press contact with the inner wall surface of the housing 51 to impose preload thereon, specifically with the inner wall surface 51b on the side of which the opening portion 51a is formed.

The first electrode 57 is provided on the surface of the pressure-sensitive conductive rubber 52 for reference on the side opposite to the surface on which the pressure-sensitive conductive rubber 52 for reference is brought into press contact with the inner wall surface 51b, and the second electrode 58 is provided on the surface of the pressure-sensitive conductive rubber 53 for detection on the side opposite to the surface on which the pressure-sensitive conductive rubber 53 for detection is brought into press contact with the inner wall surface 51b.

The movable member 54 is made of metal or resin having high rigidity. The movable member 54 is held inside the housing 51 to be movable with respect to the housing 51 so that the movable member 54 will be biased by the elastic member 55 in a direction toward the inner wall surface 51b to press the pressure-sensitive conductive rubbers 52 and 53 through the electrodes 57 and 58. In other words, an elastic force (biasing force) of the elastic member 55 acts on the movable member 54 to press the pressure-sensitive conductive rubbers 52 and 53 on the inner wall surface 51b. Further, when the external load acts on the acting piece 59, the movable member 54 moves in parallel therewith against the biasing force of the elastic member 55 in a direction to get away from the inner wall surface 51b. Thus, the movable member 54 is provided inside the housing 51 to be movable in a direction to come close to or get away from the inner wall surface 51b.

The elastic member 55 is made of rubber or a spring to bias the movable member 54 in the direction toward the inner wall surface 51b so as to press the pressure-sensitive conductive rubbers 52 and 53 through the movable member 54 and hence to press the pressure-sensitive conductive rubbers 52 and 53 against the inner wall surface 51b. It is preferred that the elastic member 55 be made of rubber. Note that the elastic member 55 should be a softer member (with lower hardness) than the pressure-sensitive conductive rubbers 52 and 53. In this case, when the members 52 to 58 that make up the sensor are assembled in the housing 51, the thickness of rubber is so adjusted that the rubber of the elastic member 55 will be compressed to produce preload.

The biasing portion 56 made up of the movable member 54 and the elastic member 55 causes the pressure-sensitive conductive rubbers 52 and 53 to be pressed integrally against the inner wall surface 51b of the housing 51 so that preload will be imposed on the pressure-sensitive conductive rubbers 52 and 53.

The electrodes 57 and 58 are provided between the pressure-sensitive conductive rubbers 52 and 53 and the movable member 54 so that the electrodes 57 and 58 will be electrically connected to the pressure-sensitive conductive rubbers 52 and 53, respectively.

The load detecting circuit 50B carries out a correction operation on the creep characteristics based on changes in the electric resistance values of the pressure-sensitive conductive rubbers 52 and 53 to calculate an external load.

Here, the pressure-sensitive conductive rubbers 52 and 53 are set to have the same creep characteristics caused by the preload. Specifically, the quality of material and the thickness of the pressure-sensitive conductive rubbers 52 and 53 are set to be the same as each other, and the shapes of the electrodes 57 and 58 are so set that the creep characteristics of the pressure-sensitive conductive rubbers 52 and 53 will become the same. However, the quality of material and the thickness of the pressure-sensitive conductive rubbers, and the shapes of the electrodes may not be as mentioned above as long as the creep characteristics of the pressure-sensitive conductive rubber 52 for reference and the pressure-sensitive conductive rubber 53 for detection become the same.

The acting piece 59 is covered with the cover member 5 so that the external load will act on the acting piece 59 through the cover member 5. This acting piece 59 is brought into press contact with the cover member 5 to make the gap vanishingly small. Thus, a minute amount of load can be detected with a high degree of accuracy.

The biasing force of the biasing portion 56 brings the pressure-sensitive conductive rubber 52 for reference into press contact with the inner wall surface 51b of the housing 51, a part of the pressure-sensitive conductive rubber 53 for detection into press contact with the inner wall surface 51b of the housing 51, and the remaining part of the pressure-sensitive conductive rubber 53 for detection into press contact with the cover member 5 of the acting piece 59. Thus, the same preload is imposed on the pressure-sensitive conductive rubbers 52 and 53.

Figure 3:
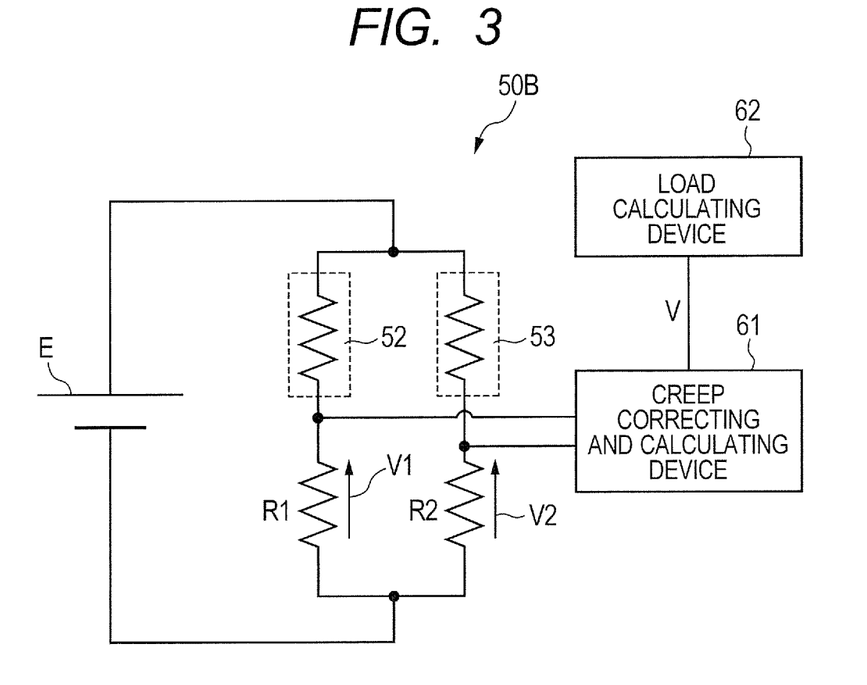
FIG. 3 is an illustrative diagram illustrating the structure of a load detecting circuit.

Next, the load detecting circuit 50B as a load detecting portion will be described in detail. FIG. 3 is an illustrative diagram illustrating the structure of the load detecting circuit 50B. The load detecting circuit 50B has a DC power supply E as a constant-voltage source, a first resistor R1 connected in series with the pressure-sensitive conductive rubber 52 for reference, and a second resistor R2 connected in series with the pressure-sensitive conductive rubber 53 for detection. A constant voltage of the DC power supply E is applied to the series circuit of the pressure-sensitive conductive rubber 52 for reference and the resistor R1. The constant voltage of the DC power supply E is also applied to the series circuit of the pressure-sensitive conductive rubber 53 for detection and the resistor R2. In the embodiment, the voltage of the DC power supply E is set to 5V, and the resistance value of the resistor R1 and the resistor R2 is to 1 kΩ.

The application of the constant voltage causes electric current corresponding to the electric resistance value to flow through the pressure-sensitive conductive rubber 52 for reference, and the flow of this current through the resistor R1 generates voltage proportional to the current between the terminals of the resistor R1. Similarly, the application of the constant voltage causes electric current corresponding to the electric resistance value to flow through the pressure-sensitive conductive rubber 53 for detection, and the flow of this current through the resistor R2 generates voltage proportional to the current between the terminals of the resistor R2. Note that resistors having the same electric resistance value are used as the resistor R1 and the resistor R2.

The load detecting circuit 50B has a creep correction computing unit 61 for taking in, as detected values, voltage values V1 and V2 of the voltage generated across these resistors R1 and R2 to make a creep characteristic correction, and a load computing unit 62 for determining load based on the output result of the creep correction computing unit 61.

Specifically, the creep correction computing unit receives input of the voltage value V1 as a first detected value corresponding to the electric current flowing through the pressure-sensitive conductive rubber 52 for reference, and input of the voltage value V2 as a second detected value corresponding to the electric current flowing through the pressure-sensitive conductive rubber 53 for detection. Then, the creep correction computing unit 61 determines a difference V between the voltage value V1 and the voltage value V2, specifically a difference (V2−V1). In other words, the voltage value V1 detected by using the pressure-sensitive conductive rubber 52 for reference is subtracted from the voltage value V2 detected by using the pressure-sensitive conductive rubber 53 for detection to correct the creep characteristics, i.e., to cancel out an output fluctuation caused by the creep characteristics in order to obtain a corrected voltage value V.

The load computing unit 62 receives input of the voltage value V after the creep characteristics is corrected to calculate an external load corresponding to the voltage value V with the creep characteristics corrected. For example, a table in which voltage values and external loads are associated is stored in a storage unit, not illustrated, and the load computing unit 62 refers to this table to determine the external load. Here, the external load may be determined by using an arithmetic expression instead of the table.

Figure 4:
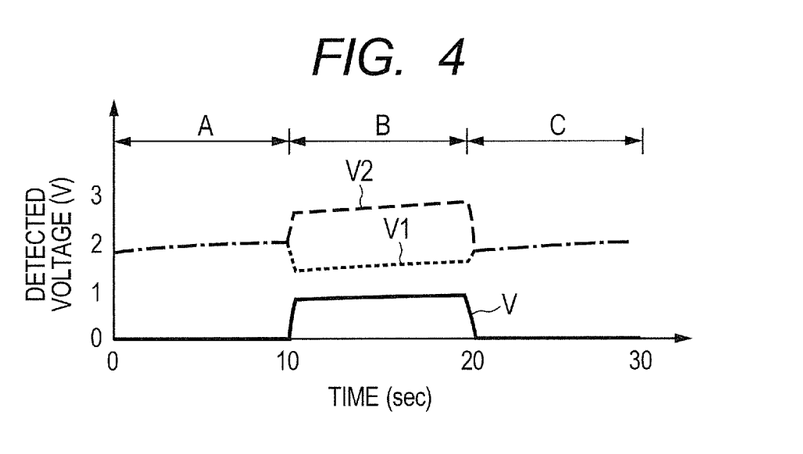
FIG. 4 is a graph illustrating a detected voltage-time relationship in the pressure-sensitive sensor of the embodiment.

Next, the operation of the pressure-sensitive sensor 50 of the embodiment will be described. FIG. 4 is a graph illustrating a detected voltage-time relationship in the pressure-sensitive sensor 50 of the embodiment. In FIG. 4, a time domain A is a period during which no load is applied, a time domain B is a period during which a constant load is applied, and a time domain C is a period during which the load is released. In the embodiment, the period in each of the time domains A, B, and C is ten seconds, respectively.

In the time domain A in which no load is applied, since the elastic member 55 is compressed inside the housing 51, preload is imposed on the pressure-sensitive conductive rubbers 52 and 53. In this period, changes in the electric resistance values occur with time in the pressure-sensitive conductive rubbers 52 and 53 due to the creep characteristics of rubber. In the case of a pressure-sensitive conductive rubber having the same composition as the pressure-sensitive conductive rubber 52 for reference (detected voltage value V1) and the pressure-sensitive conductive rubber 53 for detection (detected voltage value V2) used in the embodiment has the shape of a disk with a radius of 5.5 mm and a thickness of 0.5 mm, the rate of decrease in electric resistance value due to the creep characteristics when a weight of 100 g is placed on the pressure-sensitive conductive rubber was approximately 30% for ten seconds. Since the pressure-sensitive conductive rubbers 52 and 53 are set to have the same creep characteristics caused by preload, the changes in the electric resistance values due to the creep characteristics becomes equal to each other.

Therefore, the difference V between the detected voltage values V1 and V2 is calculated in the load detecting circuit 50B so that a correction is made for a voltage fluctuation caused by the creep characteristics. Further, the preload imposed inside the housing 51 can increase the load detection sensitivity when load is applied to the acting piece 59 provided on the pressure-sensitive conductive rubber 53 for detection.

Next, in the time domain B in which a constant load is applied, the application of the load to the acting piece 59 provided on the pressure-sensitive conductive rubber 53 for detection moves the movable member 54 in parallel with the load in a direction to get away from the inner wall surface 51b so that the elastic member 55 will be compressed and deformed. At this time, the electrodes 57 and 58 placed on the movable member 54 also move in parallel with the load. Therefore, the preload imposed on the pressure-sensitive conductive rubbers 52 and 53 is reduced. At this time, since the preload imposed on the pressure-sensitive conductive rubbers 52 and 53 is equal to each other, the influence of the creep characteristics due to the preload can be corrected in the load detecting circuit 50B.

Next, in the time domain C in which the load is released, when the load acting on the acting piece 59 provided on the pressure-sensitive conductive rubber 53 for detection is released, the movable member 54 is pushed back due to the restoring force of the elastic member 55. At this time, since the preload imposed on the pressure-sensitive conductive rubbers 52 and 53 is equal to each other, the influence of the creep characteristics can be corrected in the load detecting circuit 50B.

As described above, according to the embodiment, an external load is determined from a difference as the detection results of the pressure-sensitive conductive rubber 52 for reference on which preload is imposed and the pressure-sensitive conductive rubber 53 for detection on which the preload is imposed and the external load acts. Therefore, a fluctuation of output voltage caused by the creep characteristics of the pressure-sensitive conductive rubber 53 for detection is removed and corrected. Thus, the detection accuracy of the external load is improved.

Further, since the pressure-sensitive conductive rubbers 52 and 53 are biased integrally by the biasing portion 56, the difference in imposed preload between the pressure-sensitive conductive rubbers 52 and 53 can be reduced. Therefore, the influence of the creep characteristics due to the preload, i.e., a variation in detected value due to the change of the electric resistance value with time due to the creep characteristics can be corrected effectively.

Particularly, when load is applied to or released from the pressure-sensitive conductive rubber 53 for detection, the movable member 54 moves in a parallel fashion inside the housing 51. In this case, even if the preload imposed on the pressure-sensitive conductive rubbers 52 and 53 fluctuates, the amounts of fluctuation will be the same as each other. Therefore, the preload imposed on the pressure-sensitive conductive rubbers 52 and 53 becomes equal to each other, so that the influence of the creep characteristics due to the preload can be corrected more effectively.

Further, since the acting piece 59 is exposed on the outside of the housing 51, the external load can be transmitted only to the pressure-sensitive conductive rubber 53 for detection to prevent the transmission of the external load to the pressure-sensitive conductive rubber for reference, the influence of the creep characteristics can be corrected effectively.

Further, since the acting piece 59 projects outside of the housing 51, the acting piece 59 can be brought into press contact with the cover member 5 more effectively. Therefore, the formation of a gap can be prevented to enable the detection of a minute amount of load more accurately.

Figure 5:
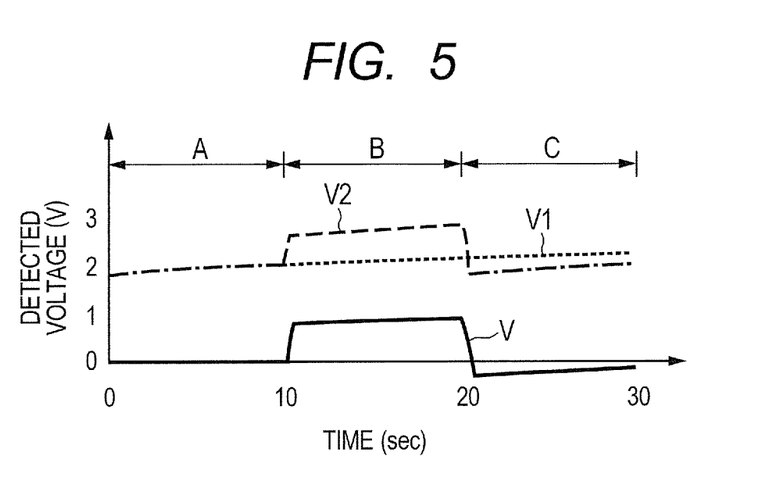
FIG. 5 is a graph illustrating a detected voltage-time relationship in a pressure-sensitive sensor as a modification.

In the aforementioned embodiment, the pressure-sensitive sensor 50 includes the biasing portion 56, but the biasing portion 56 can be omitted as needed. For example, the pressure-sensitive conductive rubbers 52 and may be housed within the housing 51 in a compressed state so that preload will be imposed on condition that the pressure-sensitive conductive rubbers 52 and 53 are brought into press contact with the inner wall surface of the housing 51. FIG. 5 is a graph illustrating a detected voltage-time relationship in a pressure-sensitive sensor with the biasing portion 56 omitted as a modification. A voltage component due to the influence of the creep characteristics is superimposed on the voltage value V2 as the detected value by the pressure-sensitive conductive rubber 53 for detection.

A constant amount of preload is imposed on the pressure-sensitive conductive rubber 52 for reference regardless of the state of load on the pressure-sensitive conductive rubber 53 for detection, and the corresponding voltage value V1 is detected in the load detecting circuit 50B. Thus, the load detecting circuit 50B determines the difference V between the voltage value V2 and the voltage value V1 to determine load based on the result.

In this case, for example, in the time domain C in which the load is released, even if the preload imposed on the pressure-sensitive conductive rubbers 52 and 53 is equal to each other, the elapsed times since the preload was imposed have been different from each other. Therefore, the creep characteristics are different between the pressure-sensitive conductive rubber 52 for reference and the pressure-sensitive conductive rubber 53 for detection. In this case, although the correction effect is not more than that in the aforementioned embodiment, the detection accuracy is improved compared with the case where the external load is determined using the voltage value V2 before being corrected.

In the aforementioned embodiment, the pressure-sensitive conductive rubbers 52 and 53 are so formed that the creep characteristics due to preload will be the same, but the pressure-sensitive conductive rubbers 52 and 53 may be so formed that the creep characteristics due to preload will be different from each other. This is because the creep characteristics can be corrected by performing arithmetic processing in the load detecting circuit 50B, such as to multiply the detected voltage of the pressure-sensitive conductive rubbers 52 and 53 by a correction coefficient. This can increase the accuracy of creep correction to achieve a higher accuracy or to eliminate the restrictions on the shapes of the pressure-sensitive conductive rubbers 52 and 53, and the electrodes 57 and 58, enabling downsizing.

Further, in the aforementioned embodiment, voltage values are detected as the detected values, but electric current flowing through the pressure-sensitive conductive rubbers 52 and 53 may be detected as the detected values.

Further, in the aforementioned embodiment, the cover member 5 is a member provided separately from the pressure-sensitive sensor 50, but the pressure-sensitive sensor may have the cover member.

Further, in the aforementioned embodiment, the load detecting circuit 50B calculates (V2−V1) as the difference, but (V1−V2) may be calculated. In this case, if the value of the difference and the external load is associated beforehand, the external load can be determined.

Further, in the aforementioned embodiment, the biasing portion 56 is made up of the movable member 54 and the elastic member 55, but the structure of the biasing portion is not limited thereto, and the biasing portion may be made up of an elastic member alone.

Further, in the aforementioned embodiment, the housing 51 is a rigid body, but a portion contacting the pressure-sensitive conductive rubber 53 for detection in the housing may be made of an elastic member such as rubber so that the external load may act on the pressure-sensitive conductive rubber 53 for detection without acting on the pressure-sensitive conductive rubber 52 for reference. In this case, the acting piece can be omitted.

In addition, the acting piece 59 may be formed integrally with the pressure-sensitive conductive rubber 53 for detection as the same member as the pressure-sensitive conductive rubber 53 for detection.

Second Embodiment

Next, a second embodiment of the present invention will be described. Note that components having substantially the same functions as those in the first embodiment are given the same reference numerals in the description of the second embodiment to omit redundant description.

Figure 7:
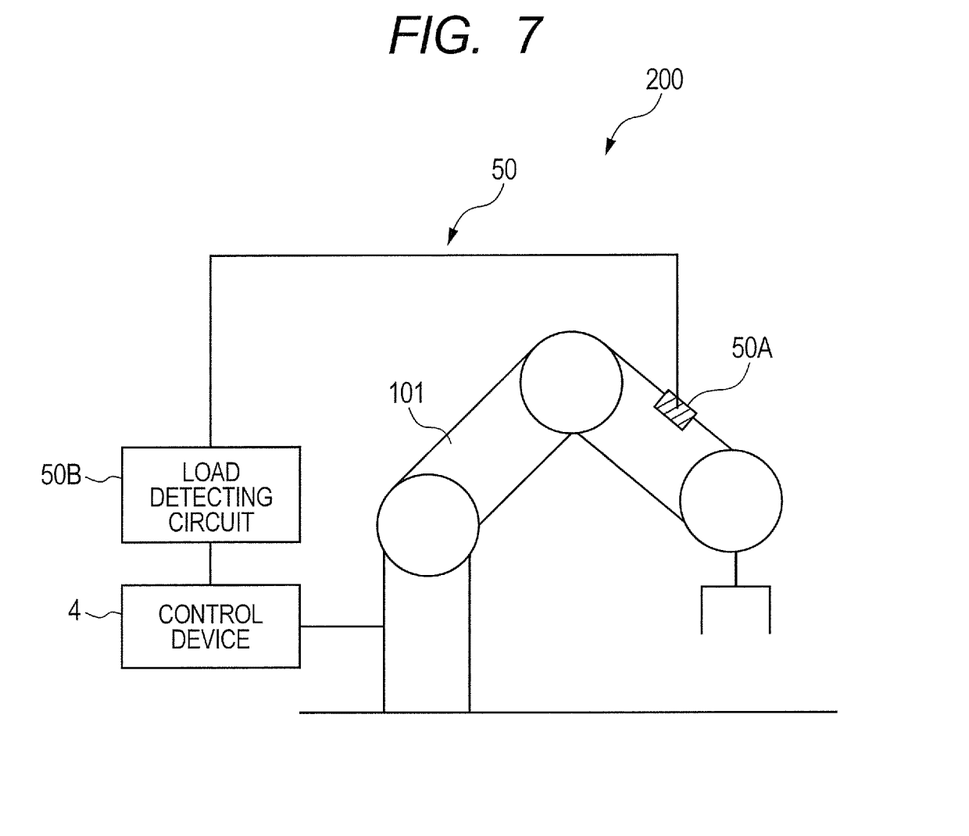
FIG. 7 is an illustrative diagram illustrating the schematic structure of a robot manipulator in which a pressure-sensitive sensor according to a second embodiment of the present invention is incorporated.

FIG. 7 is an illustrative diagram illustrating the schematic structure of a robot manipulator in which the pressure-sensitive sensor according to the embodiment of the present invention is incorporated. A robot manipulator 200 shown in FIG. 7 includes a robotic arm 101 and a controller 4 for actuating the robotic arm.

In the robot manipulator 200, a pressure-sensitive sensor 50 is provided on a robotic arm 101 to detect a force acting from the outside in order to detect a contact between the robotic arm 101 and an external environment such as a human being or an object.

The robotic arm 101 includes an actuator, not illustrated. The operation of the robotic arm 101 is controlled by a control signal from the controller 4. When the pressure-sensitive sensor 50 placed on the robotic arm 101 detects a contact between the robotic arm 101 and an external environment, the operational mode of the robotic arm 101 is switched (such as to stop or change the direction of movement).

The pressure-sensitive sensor 50 has the sensor body 50A and the load detecting circuit 50B. In the embodiment, the sensor body 50A is placed on a part of the outer covering of the robotic arm 101 to detect a contact between the robotic arm 101 and the external environment. As described in the first embodiment with reference to FIG. 2, the pressure-sensitive sensor 50 has the housing 51, the pressure-sensitive conductive rubber 52 for reference as the first pressure-sensitive conductive rubber provided inside the housing 51, and the pressure-sensitive conductive rubber 53 for detection as the second pressure-sensitive conductive rubber provided inside the housing 51. The sensor body 50A has components provided inside the housing 51, namely, the biasing portion 56 made up of the movable member 54 and the elastic member 55, the electrode 57 connected to the pressure-sensitive conductive rubber 52 for reference, and the electrode 58 connected to the pressure-sensitive conductive rubber 53 for detection. The acting piece 59 is made of rubber or metal, and fixed on the pressure-sensitive conductive rubber 53 for detection with an adhesive or the like. The acting piece 59 is formed to project outside of the housing 51 through the opening portion 51a so that an external load will easily act on the acting piece 59. The biasing force of the biasing portion 56 brings the pressure-sensitive conductive rubber 52 for reference into press contact with the inner wall surface 51b of the housing 51, and a part of the pressure-sensitive conductive rubber 53 for detection into press contact with the inner wall surface 51b of the housing 51. Thus, respective members that make up the sensor body 50A are brought into press contact with each other inside the sensor body 50A to make a gap vanishingly small. However, since the biasing force of the biasing portion 56 is exerted on the pressure-sensitive conductive rubbers 52 and 53, changes in the electric resistance values occur with time due to the creep characteristics. Therefore, the creep characteristics are corrected in the load detecting circuit 50B so that a minute amount of load acting on the acting piece 59 can be detected accurately.

Next, the effects of the pressure-sensitive sensor 50 of the embodiment will be described.

Since the pressure-sensitive sensor 50 of the embodiment can detect a minute amount of load, a contact between a portion where the sensor body 50A is placed on the robotic arm 101 and the external environment such as a human being or an object can be detected with a high degree of accuracy. The detection of the contact with a high degree of accuracy can switch the operational mode of the robotic arm 101 at the time of the contact (such as to stop or change the direction of movement) more quickly. This can reduce damage to the external environment such as a human being or an object due to the contact with the robotic arm 101, and further reduce damage to the robotic arm 101 itself.

In the sensor body 50A of the embodiment, the acting piece 59 for detecting a contact with the external environment is formed integrally with the pressure-sensitive conductive rubber 53 for detection as an elastic member. Further, the biasing portion 56 is made up of the elastic member 55. At the time of the contact between the sensor body 50A mounted on the robotic arm 101 and the external environment, these elastic members play a role in absorbing a shock due to the contact. This can reduce damage to the external environment such as a human being or an object due to the contact with the robotic arm 101, and further reduce damage to the robotic arm 101 itself.

In general, various characteristics of rubber such as the elastic coefficient vary depending on the environmental temperature. Since the pressure-sensitive conductive rubber is formed by containing conductive particles in rubber, the state of a contact between conductive particles upon application of a certain amount of load varies depending on the environmental temperature. Therefore, the characteristics of the electric resistance values with respect to the load vary depending on the environmental temperature to vary the creep characteristics upon application of a constant load. Therefore, when the pressure-sensitive conductive rubber is used accurately at a place where the environmental temperature varies widely, the pressure-sensitive conductive rubber must be used in consideration of changes in creep characteristics. The pressure-sensitive sensor 50 of the embodiment is made up of the pressure-sensitive conductive rubber 52 for reference and the pressure-sensitive conductive rubber 53 for detection in such a manner that the load detecting circuit 50B corrects the creep characteristics from the electric resistance values of the pressure-sensitive conductive rubber 52 for reference and the pressure-sensitive conductive rubber 53 for detection. Since the pressure-sensitive sensor 50 of the embodiment can correct the creep characteristics, load can be detected accurately even at the place where the environmental temperature varies widely. Thus, the sensor body 50A produces heat by the movement of the robotic arm 101 such as by the actuator of the robotic arm 101 to enable use of the sensor body 50A accurately even when the sensor body 50A is placed near the place where the environmental temperature varies widely.

Further, in the embodiment, one pressure-sensitive sensor 50 is provided for one robotic arm 101, but two or more pressure-sensitive sensors 50 may be provided. When two or more pressure-sensitive sensors 50 are provided, since the number of detection points of a contact between the robotic arm 101 and the external environment can be increased, the contact with the external environment can be detected in detail. When two or more pressure-sensitive sensors 50 are provided, the load detecting circuit 50B may be designed to be able to process sensor signals from two or more sensor bodies 50A.

Further, in the embodiment, the contact with the external environment is detected directly in the acting piece 59, but the acting piece 59 may be covered with a cover member as an elastic member such as rubber to protect the acting piece 59 so as to detect the contact with the external environment indirectly. When the acting piece 59 is covered with the cover member, the acting piece 59 is brought into press contact with the cover member to make a gap between members vanishingly small so that a minute amount of load can be detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-270015, filed Dec. 9, 2011, which is hereby incorporated by reference herein in its entirety.

What is claimed is:

1. A pressure-sensitive sensor comprising:
   a first pressure-sensitive conductive rubber provided inside a housing in such a state that preload is imposed thereon;
   a second pressure-sensitive conductive rubber provided inside the housing in such a state that the preload is imposed thereon and an external load acts thereon;
   a load detecting portion for applying voltage to the first and second pressure-sensitive conductive rubbers to determine the external load based on a difference between a first detected value corresponding to electric current flowing through the first pressure-sensitive conductive rubber and a second detected value corresponding to electric current flowing through the second pressure-sensitive conductive rubber; and
   a biasing portion for pressing the first and second pressure-sensitive conductive rubbers integrally against an inner wall surface of the housing to impose the preload on the first and second pressure-sensitive conductive rubbers,
   wherein the biasing portion has a movable member provided inside the housing to be movable, and an elastic member for biasing the movable member in a direction in which the movable member is pressed against the first and second pressure-sensitive conductive rubbers, and
   wherein an opening portion is formed in the housing, and an acting piece is provided on the second pressure-sensitive conductive rubber to project outside of the housing through the opening portion so that the external load will act on the second pressure-sensitive conductive rubber.

2. The pressure-sensitive sensor according to claim 1, wherein said acting piece is covered with a cover member.

3. A grip apparatus equipped with the pressure-sensitive sensor according to claim 1.

4. A robot manipulator equipped with the pressure-sensitive sensor according to claim 1.

* * * * *